UNITED STATES PATENT OFFICE.

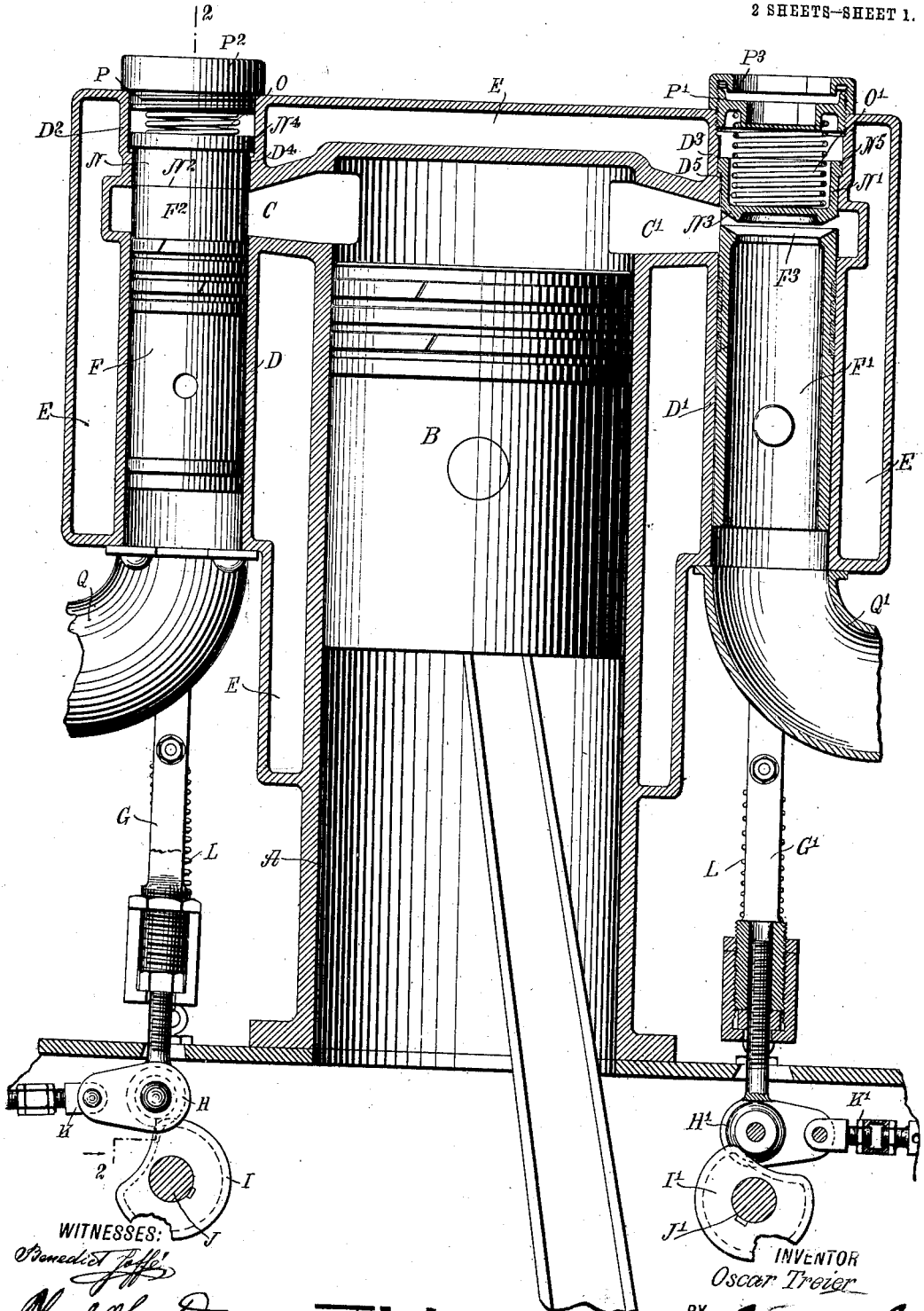

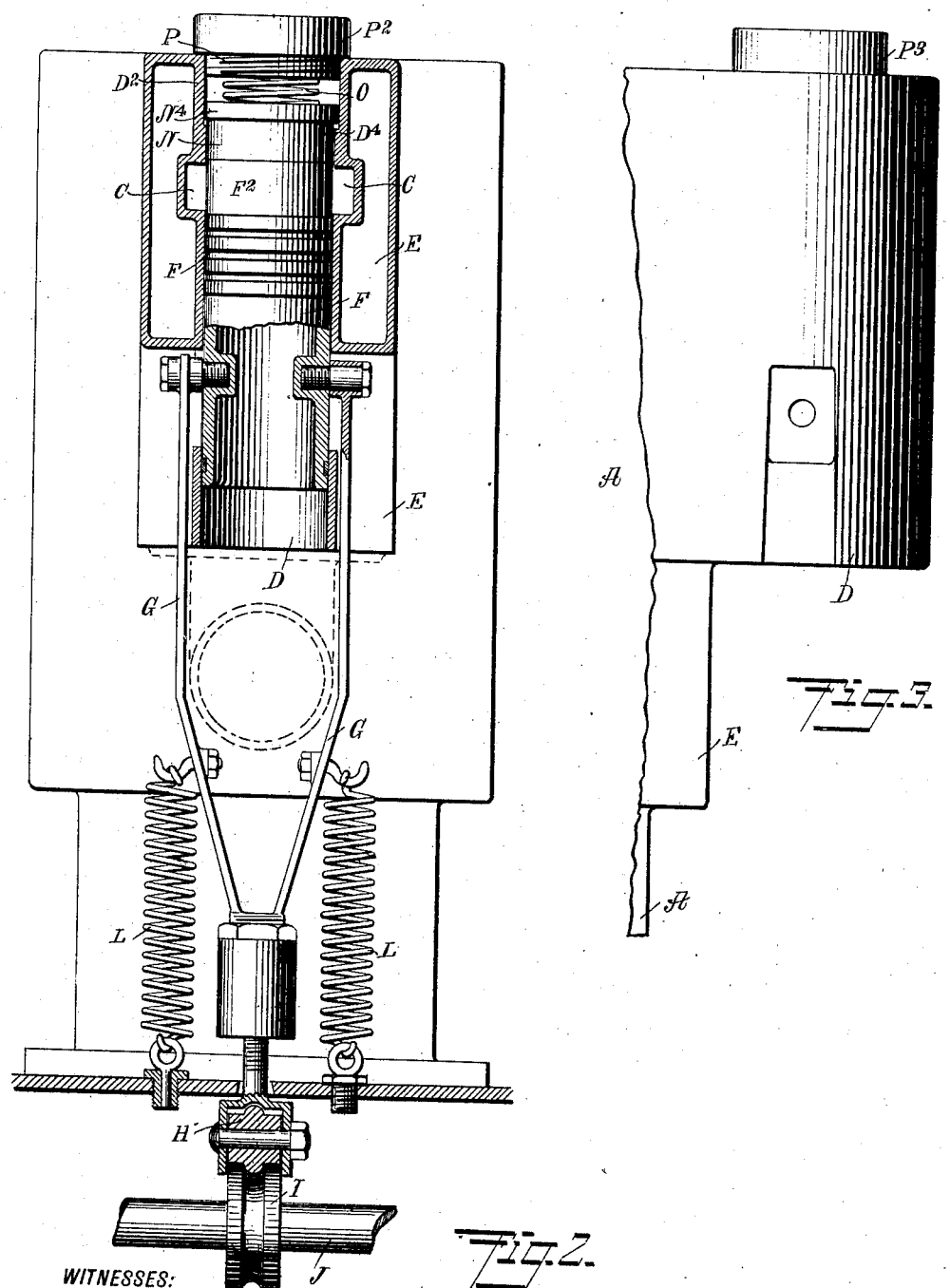

OSCAR TREIER, OF NEW YORK, N. Y.

ENGINE VALVE MECHANISM.

997,105.  Specification of Letters Patent.  Patented July 4, 1911.

Application filed July 12, 1910. Serial No. 571,594.

*To all whom it may concern:*

Be it known that I, OSCAR TREIER, a citizen of Switzerland, and a resident of the city of New York, borough of Manhattan, in the county and State of New York, have invented a new and Improved Engine Valve Mechanism, of which the following is a full, clear, and exact description.

The object of the invention is to provide a new and improved valve mechanism, more especially designed for use in internal combustion engines, and arranged to insure proper opening and closing of the admission and exhaust valves, and to prevent leakage of the motive agent at the valves.

For the purpose mentioned, use is made of a hollow valve for the passage of the motive agent (either live or exhaust), and the valve is adapted to engage a yieldingly mounted cap for closing or opening the hollow valve.

A practical embodiment of the invention is represented in the accompanying drawings forming a part of this specification, in which similar characters of reference indicate corresponding parts in all the views.

Figure 1 is a sectional side elevation of the valve mechanism as applied to internal combustion engines; Fig. 2 is a cross section of the same on the line 2—2 of Fig. 1; and Fig. 3 is a side elevation of part of the cylinder, showing more particularly the passage for the pivotal connection of the valve-actuating mechanism.

In the cylinder A of the engine is mounted to reciprocate the piston B, and the upper end or working chamber of the cylinder A is connected with the chambers C and C', one being the admission chamber and the other the exhaust chamber, the chambers connecting with the chests D, D', the latter being surrounded by a water jacket E, which also surrounds the cylinder A, at its upper portion, as plainly indicated in Fig. 1. In the chests D and D' are mounted to slide hollow valves F and F', pivotally connected with rods G, G' supporting friction rollers H, H', in peripheral engagement with cams I, I', secured on cam shafts J, J', driven from and rotating in unison with the engine shaft. The lower ends of the rods G and G' are pivotally connected with coupling links K, K', fulcrumed on the engine bed, and springs L press on the rods G, G', to hold the friction rollers H, H' in peripheral contact with the cams I, I', respectively.

The upper ends of the valves F, and F', are provided with valve seats $F^2$, $F^3$, adapted to engage opposite valve seats $N^2$, $N^3$, formed on the bottom of caps N, N', mounted to slide in chambers $D^2$, $D^3$, arranged on the top of the chambers C and C'. The caps N and N' are pressed on in a downward direction by springs O, O', held in the chambers $D^2$, $D^3$, and engaging nuts P, P', screwing in the upper ends of the said chambers. Now by adjusting the nuts P, P', the tension of the springs O, O' can be regulated. Jam nuts $P^2$, $P^3$ serve to lock the nuts P, P' in place after the desired adjustment is made. The caps N and N' are provided at their upper ends with annular shoulders $N^4$, $N^5$, adapted to be seated on similar shoulders $D^4$, $D^5$, formed in the chambers $D^2$, $D^3$, so as to limit the desired movement of the caps N and N', as will be readily understood by reference to Fig. 1. When the caps N and N' are in their lowermost positions, then their seats $N^2$, $N^3$ project into the chambers C and C', and when the valves F and F' are lifted by the action of the cams I and I' then the seats $F^2$, $F^3$ move in engagement with the seats $N^2$, $N^3$, so that the passage between the chambers C, C' and the valves F, F' is closed. When the valves F and F' are lifted to their full extent, the caps N and N' after closing the valves are likewise lifted against the tension of the spring O and O', so that the caps firmly close the upper ends of the valves F and F', to prevent leakage of the motive agent to or from the working chamber of the cylinder A. When the valves F and F' are lowered, the caps N and N' move downward with the said valves until their annular shoulders $N^4$, $N^5$ are seated on the shoulders $D^4$, $D^5$, and the valves F, F' on a further downward movement finally move out of contact with the caps N, N', so as to establish communication between the valves and the chambers C, C'.

It is understood that the cams I and I' are so arranged as to open and close the valves F and F' alternately, to properly control the passage of the motive agent to and from the working chamber of the cylinder A.

The lower ends of the chests D and D' are connected with pipes Q and Q', of which one is the admission pipe for the admission of the live motive agent, and the other is the exhaust pipe.

Having thus described my invention, I claim as new and desire to secure by Letters Patent:

1. A valve mechanism for engines, comprising a hollow valve for the passage of the motive agent, a yieldingly mounted cap for engagement by the said valve to close one end thereof, and means for imparting movement to the said valve.

2. A valve mechanism for engines, comprising a hollow movable valve for the passage of the motive agent and provided at one end with a valve seat, a spring-pressed movable cap having a valve seat for engagement by the valve seat of the said valve to close or open the latter, and means for actuating the said valve.

3. In combination with an engine cylinder having a chamber for the passage of the motive agent to or from the said cylinder, a hollow valve mounted to slide and provided at one end with a valve seat extending into the said chamber, a second chamber arranged on top of the first mentioned chamber, a cap mounted to slide in said second chamber and having a valve seat adapted to be engaged by the said seat on the valve, a spring arranged in said second chamber and pressing the said cap, and means for imparting movement to the said valve.

4. In combination with an engine cylinder having a chamber for the passage of the motive agent to or from the said cylinder, a hollow valve mounted to slide and provided at one end with a valve seat extending into the said chamber, a second chamber arranged on top of the first mentioned chamber, a cap mounted to slide in said second chamber and having a valve seat adapted to be engaged by the said seat on the valve, a spring in said chamber pressing the said cap, a nut screwing in the upper end of said chamber and engaging the spring for adjusting the tension of the spring, and means for imparting movement to the said valve.

5. In an engine, the combination of an engine cylinder having a chamber for the passage of the motive agent to and from the said cylinder, a chest opening into the said chamber, a hollow valve mounted to slide in the said chest and through which the motive agent passes, a spring-pressed cap having a limited sliding motion and in axial alinement with the said valve, and means for actuating the said valve to move the latter in and out of engagement with the said cap.

6. A valve mechanism for engines, comprising a valve chest, a hollow valve mounted to slide in the valve chest and through which the motive agent passes, a yieldingly mounted cap for engagement by the said valve to close one end thereof, and means for imparting movement to the said valve.

7. A valve mechanism for engines, comprising a hollow cylindrical valve chest, a hollow cylindrical valve mounted to slide in said chest and through which the motive agent passes, the said valve being provided at one end with a valve seat, a spring-pressed movable cap closed at one end and having a valve seat at said end for engagement by the valve seat of the valve to close or open the latter, and means for actuating the said valve.

8. The combination with an engine cylinder having an admission and an exhaust chamber connected therewith, of valve chests opening into the said chambers, hollow valves mounted to slide in the said valve chests, spring-pressed caps having a limited sliding motion and in axial alinement with the said valves, and means for actuating the said valves to move the latter alternately into and out of engagement with the said caps.

9. In an engine, the combination with an engine cylinder having an admission and an exhaust chamber connected respectively with the working chamber of the cylinder at opposite sides thereof, of valve chests opening into the said chambers, hollow valves mounted to slide in said chests and through which the motive agent passes, the said valves being provided at their upper ends with valve seats, chambers arranged on the top of the admission and exhaust chambers, caps mounted to slide in said chambers and provided at their lower ends with valve seats adapted to be engaged by the valve seats on the said valves, springs held in the said cap chambers and pressing on the said caps, nuts screwing in the upper ends of said cap chambers and engaging the springs to regulate the tension thereof, means for locking the nuts in place, and means for actuating the valves to move the same into and out of engagement with the said caps.

In testimony whereof I have signed my name to this specification in the presence of two subscribing witnesses.

OSCAR TREIER.

Witnesses:
DIEDRICH TIRRE,
JOSEPH BREUNIG.

---

Copies of this patent may be obtained for five cents each, by addressing the "Commissioner of Patents, Washington, D. C."